United States Patent
Mansuetto et al.

(10) Patent No.: US 7,465,518 B2
(45) Date of Patent: Dec. 16, 2008

(54) CELL WITH COPPER OXIDE CATHODE

(75) Inventors: Michael F. Mansuetto, Bay Village, OH (US); Andrew Webber, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 11/488,525

(22) Filed: Jul. 18, 2006

(65) Prior Publication Data
US 2006/0257741 A1    Nov. 16, 2006

Related U.S. Application Data

(63) Continuation of application No. 10/434,643, filed on May 9, 2003, now abandoned.

(51) Int. Cl.
*H01M 4/24* (2006.01)
*H01M 4/36* (2006.01)
*H01M 4/42* (2006.01)
*H01M 4/50* (2006.01)

(52) U.S. Cl. ............... 429/220; 429/224; 429/229; 429/206

(58) Field of Classification Search .......... 429/220, 429/229, 206, 224
See application file for complete search history.

(56) References Cited

U.S. PATENT DOCUMENTS

| | | | |
|---|---|---|---|
| 542,049 A | 7/1895 | Gordon | |
| 1,196,611 A | 8/1916 | Tassin | |
| 1,434,469 A | 11/1922 | Wilker | |
| 1,711,462 A | 4/1929 | Wescott | |
| 1,834,250 A | 12/1931 | Martus | |
| 1,835,867 A | 12/1931 | Heise | |
| 2,646,458 A | 7/1953 | Walz | |
| 2,788,383 A | 4/1957 | Robinson | |
| 2,859,266 A | 11/1958 | Garvey et al. | |
| 2,859,267 A | 11/1958 | Garvey et al. | |
| 2,986,592 A | 5/1961 | McCallum et al. | |
| 3,154,435 A | 10/1964 | Kitagawa et al. | |
| 3,615,858 A | 10/1971 | Soto-Krebs | |
| 3,796,606 A | 3/1974 | Lehmann et al. | |
| 4,105,830 A | 8/1978 | Kordesch | |
| 4,224,384 A | 9/1980 | Kozawa et al. | |

(Continued)

FOREIGN PATENT DOCUMENTS

EP    1215175 A1    6/2002

(Continued)

OTHER PUBLICATIONS

Schumacher. "The Alkaline Copper Oxide: Zinc Cell," *The Primary Battery*, vol. 1, 1971, John Wiley & Sons. Inc., New York p. 191-206.

(Continued)

*Primary Examiner*—Tracy Dove
(74) *Attorney, Agent, or Firm*—Russell H. Toye, Jr.

(57) ABSTRACT

An electrochemical battery cell with $Cu_xO$, where x is from 0.9 to 1.3, as a positive electrode active material. The specific surface area of the $Cu_xO$ is from 1.0 to 4.0 m²/gram, preferably from 1.0 to 2.9 m²/g to provide an increase in the high voltage discharge capacity of the $Cu_xO$.

12 Claims, 7 Drawing Sheets

U.S. PATENT DOCUMENTS

| | | | |
|---|---|---|---|
| 4,925,747 | A | 5/1990 | Kordesch et al. |
| 5,043,233 | A | 8/1991 | Kameoka et al. |
| 5,508,121 | A | 4/1996 | Sawa |
| 6,333,123 | B1 | 12/2001 | Davis et al. |
| 6,428,922 | B2 | 8/2002 | Bailey |
| 6,489,056 | B1 | 12/2002 | Davis et al. |
| 6,541,153 | B2 | 4/2003 | Hessabi |
| 6,541,160 | B2 | 4/2003 | Cheiky et al. |
| 6,841,302 | B2 | 1/2005 | Anglin et al. |
| 2003/0049520 | A1 | 3/2003 | Davis et al. |
| 2003/0049530 | A1 | 3/2003 | Wang et al. |
| 2003/0068552 | A1 | 4/2003 | Anglin et al. |
| 2005/0084755 | A1 | 4/2005 | Boone et al. |

FOREIGN PATENT DOCUMENTS

| | | |
|---|---|---|
| JP | 77 009812 B | 3/1977 |
| JP | 52 051534 A | 4/1977 |
| JP | 53 046640 A | 4/1978 |
| JP | 54 022523 A | 2/1979 |
| JP | 54 101135 A | 8/1979 |
| JP | 58 128655 A | 8/1983 |
| JP | 62 123659 A | 6/1987 |
| JP | 63 064263 | 3/1988 |
| JP | 02 301967 A | 12/1990 |
| WO | WO 01/04973 A1 | 1/2001 |
| WO | WO 03/096442 A2 | 11/2003 |

OTHER PUBLICATIONS

Schumacher and Heise, "The Alkaline Cell With Copper Oxide or Air Depolarization (1902-1952)", *Journal of the Electrochemical-Society*, Aug. 1952, vol. 99, No. 8, p. 191C-196C.

CELL WITH COPPER OXIDE CATHODE

CROSS-REFERENCE TO RELATED APPLICATIONS

This application is a continuation of prior application Ser. No. 10/434,643, filed on May 9, 2003 now abandoned.

BACKGROUND

This invention relates to electrochemical battery cells, particularly alkaline cells containing copper oxide as an active cathode material.

Copper oxides have been used as positive electrode active materials in electrochemical battery cells for many years. For example, copper oxide, particularly copper (II) oxide, CuO, was the active material in wet cell railway batteries, such as those described by George W. Heise and N. Corey Cahoon (eds.), The Primary Battery, John Wiley & Sons, New York, 1971, Vol. 1, Chapter 4, pp. 192-205. Copper oxides have also been used as active materials in dry cell batteries with aqueous and nonaqueous electrolytes. Examples include dry cell alkaline batteries with zinc as the negative electrode active material, and nonaqueous batteries with lithium as the negative electrode active material. Copper oxide cell designs have included button and cylindrical cell shapes and flat, bobbin and spirally wound electrode configurations. An advantage of copper oxide as an active positive electrode material is its high density compared to other commonly used materials, such as manganese dioxide. As disclosed by Davis et al. in U.S. Pat. No. 6,489,056, issued Dec. 3, 2002, CuO may also be advantageous as a replacement for electrolytic manganese dioxide (EMD) in alkaline cells that have a zinc anode free of lead, mercury, or cadmium, since CuO can more quickly absorb hydrogen generated in the anode than EMD at high temperature.

When alkaline Zn/CuO cells are discharged, CuO is reduced to metallic copper. In some cases a distinct step has been observed between two voltage plateaus in the voltage vs. time discharge curve for CuO, while in others the discharge curve has a single voltage plateau. The presence of two voltage plateaus suggests that the discharge may involve the reduction of both CuO and $Cu_2O$, with the higher plateau (about 1.05-1.1 volts) corresponding with the reduction of CuO, and the lower plateau (about 0.85-0.88 volt) corresponding with a reduction of $Cu_2O$. The discharge mechanism is very complex and not fully understood.

Regardless of the mechanism, conventional Zn/CuO cells operate almost entirely at the same low voltage as a Zn/$Cu_2O$ cell. When two plateaus have been observed, the first one tends to be short in duration. Though the total cell capacity may be high, most of that capacity is delivered at a low voltage. This low voltage may be too low to even operate some devices designed to use "1.5 volt" Zn/$MnO_2$ batteries. Devices with lower operating voltages might operate for a time using alkaline Zn/CuO batteries made according to the prior art, but that time may be too short for such Zn/CuO batteries to be considered as practical replacements for alkaline Zn/$MnO_2$ batteries.

In view of the above, an object of the present invention is to provide a high capacity electrochemical battery cell with a copper oxide positive electrode.

Another object of the present invention is to provide an electrochemical battery cell that is able to deliver improved capacity when discharged to a high voltage endpoint.

Another object of the present invention is to provide a copper oxide electrochemical battery cell with improved discharge characteristics that is economical to produce.

SUMMARY

The above objects are met and the above disadvantages of the prior art are overcome by an electrochemical battery cell of the present invention.

It has been discovered that when CuO with high surface area is used, the average discharge voltage is substantially increased, as is the capacity delivered at the higher voltage. While not wishing to be bound by theory, it is believed that by increasing the CuO surface area the initial discharge operates at the higher voltage of CuO rather than dropping quickly to reflect the potential of $Cu_2O$. This means that a larger proportion of the total capacity of the CuO is delivered at the higher voltage.

Accordingly, in one aspect the present invention is directed to an electrochemical battery cell comprising a cell container, a positive electrode comprising a positive electrode active material, a negative electrode comprising a negative electrode active material, a separator disposed between the positive and negative electrodes and an electrolyte. The positive electrode active material comprises CuO that, when tested, has a BET specific surface area from 1.0 to 4.0 $m^2$/gram.

Another aspect of the present invention is a primary electrochemical battery cell comprising a sealed cell container, a positive electrode comprising a positive electrode active material, a negative electrode comprising zinc and an aqueous alkaline electrolyte. The positive electrode active material comprises particulate CuO, and the CuO has a specific surface area of 1.0 to 4.0 $m^2$/gram, when determined by the BET method using specific surface area of greater than 3.0 µm, when measured by laser diffraction specific surface area of technique.

Yet another aspect of the present invention is a primary electrochemical battery cell comprising a sealed cell container, a positive electrode comprising a positive electrode active material consisting essentially of $CuO^{602}$, a gelled negative electrode comprising zinc, a separator disposed between the positive and negative electrodes, and an aqueous alkaline electrolyte comprising potassium hydroxide. The positive electrode has a hollow cylindrical shape and the separator and negative electrode are disposed within a cavity defined by an inner surface of the hollow cylinder. The positive electrode active material comprises particulate CuO with a specific surface area of 1.5 to 3.0 $m^2$/gram, when determined by the BET method using nitrogen, and a $D_{10}$ value of 1.0 to 2.0 µm, when measured by laser diffraction analysis using a unified scatter technique.

These and other features, advantages and objects of the present invention will be further understood and appreciated by those skilled in the art by reference to the following specification, claims and appended drawings.

Unless otherwise specified, the following definitions and methods are used herein:

(1) Specific surface area for a particulate material is the surface area per unit of mass ($m^2$/gram) of a degassed sample of the material, as determined by the Brunauer-Emmett-Teller (BET) method, using nitrogen. This method is based on the determination of the amount of gas that is adsorbed on the surface of the sample and includes both the external surface area and internal surface area (that of the open pores). A sample of copper oxide is degassed by increasing the temperature at a rate of 15° C./minute and holding at 150° C. for one hour.

(2) Copper oxide is any copper oxide material of the general formula $Cu_xO$, where x is from about 0.9 to about 2.2. Small amounts of impurities may also be present.
(3) CuO is a copper oxide material of the general formula $Cu_xO$, where x is from 0.9 to 1.3.
(4) The theoretical capacity of an electrode is a calculated capacity (e.g., in ampere hours, Ah) based on the specific capacity (capacities) (in Ah per gram) of the active material (materials) in the electrode, assuming that all of the active material (materials) reacts according to the nominal discharge reactions. Unless otherwise indicated or apparent, the specific capacity used herein for CuO is 0.674 Ah/g, the specific capacity for EMD is 0.380 Ah/g, assuming that all of the manganese reacts to $Mn^{+2.67}$ (an average of about 1.33 electrons per Mn atom), and the specific capacity of zinc is 0.821 Ah/g.
(5) Particle size distributions are determined by laser diffraction analysis using a unified scatter technique. Particle size analyses may be performed on a sample of material using a MICROTRAC® X-100 Particle Size Analyzer (Microtrac, Inc., Montgomery, Pa., USA), or other equipment which will produce comparable results.

Unless otherwise specified herein, all disclosed characteristics and ranges are as determined at room temperature (20-25° C.).

DESCRIPTION

The battery cell of the invention is a cell containing CuO as a positive electrode active material. The CuO used is one with a specific surface area from 1.0 to 4.0 $m^2$/gram, as determined by the BET method, using nitrogen.

CuO can be used as a positive electrode active material in aqueous alkaline electrolyte battery cells. Alkaline CuO cells can have a variety of negative electrode active materials, including, for example, zinc, aluminum and magnesium. CuO can also be used as a positive electrode active material in nonaqueous electrolyte cells, including those with lithium, aluminum and magnesium as a negative electrode active material.

Cells with CuO as a positive electrode active material can have a variety of cell designs. They can have various shapes, including button, cylindrical and prismatic. They can have various electrode configurations, including thin (e.g., printed) films, stacked flat discs or sheets, spirally wound flat strips, and configurations in which one electrode is disposed within a cavity in another electrode of opposite polarity. Examples of the latter electrode configuration include LeClanché, zinc chloride and alkaline $Zn/MnO_2$ cells. In these "bobbin" type designs, one of the positive and negative electrodes has a hollow cylindrical shape, and the other electrode is disposed within the cavity defined by the inside diameter of the hollow cylinder, with a separator between the electrodes.

Other known enhancements to CuO electrodes and cells may also be adapted to the cell of the invention. For example, a small amount of sulfur (e.g., 0.5 weight percent of the CuO) may be added to the positive electrode mixture. The benefits of sulfurization are disclosed by Schumacher and Heise in "The Alkaline Cell with Copper Oxide or Air Depolarizer (1902-1952)," *J. Electrochem. Soc.*, vol. 99, 191C (1952) and by Schumacher in "The Alkaline Copper Oxide:Zinc Cell," Chapter 4, *The Primary Battery*, Vol. 1, Eds. G. W. Heise and N. C. Cahoon, John Wiley & Sons Inc., New York (1971), pp. 191-206, both of which are hereby incorporated by reference.

Figure 1:
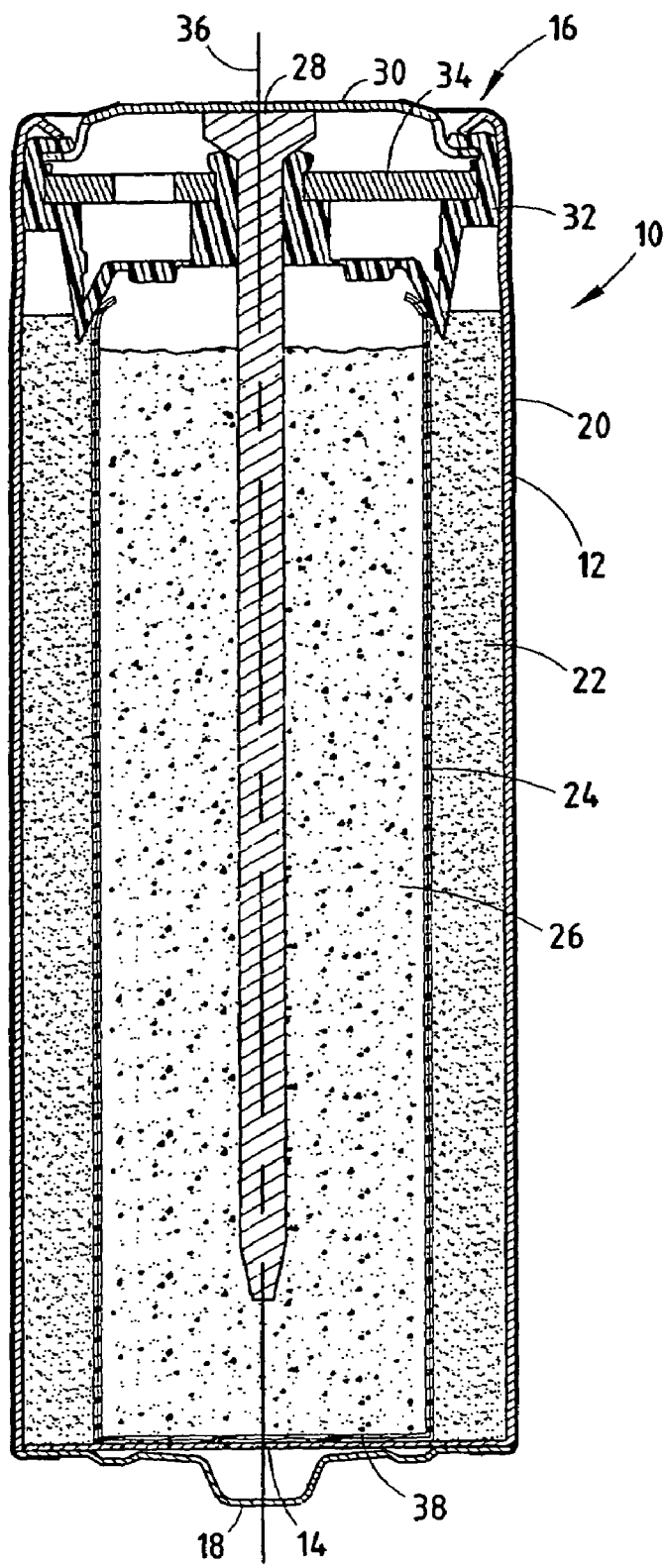
FIG. 1 is a cross-sectional view of an alkaline battery with a bobbin-type construction, taken along the longitudinal axis of the cell.

One embodiment of the electrochemical battery cell of the invention has a cell design similar to a typical cylindrical primary alkaline $Zn/MnO_2$ cell, an example of which is an LR6 (AA size) cell, such as the cell illustrated in FIG. 1. In this embodiment CuO can replace all or a portion of the $MnO_2$ as the positive electrode active material. Referring to FIG. 1, cell 10 includes a housing comprising a can with a side wall 12, a closed bottom end 14, and an open top end 16. A positive terminal cover 18 is welded or otherwise attached to can bottom 14. Alternatively, can bottom 14 may be formed to include the shape of positive terminal cover 18 in order to function as the positive terminal and eliminate the need for a separate cover. Assembled to the open top end 16 of the can is a cover and seal assembly and a negative terminal cover 30. A plastic film label 20 or other jacket may be formed about the exterior surface of the can side wall 12. Label 20 may extend over the peripheral edges of positive and negative terminal covers 18 and 30. A positive electrode (cathode) 22 is formed about the interior surface of the can. Cathode 22 is in direct contact with a portion of the can, and the can functions as the cathode current collector, providing electrical contact between cathode 22 and positive terminal cover 18. A negative electrode (anode) 26 is disposed within a cavity in cathode 22, with a separator 24 between cathode 22 and anode 26. A layer of separator 38 is also disposed between the anode 26 and the can bottom 14. An anode current collector 28 extends from negative terminal cover 30 into anode 26 to provide electrical contact between anode 26 and cover 30. An annular seal 32 is disposed in the open end 16 of the can to contain the electrode materials and electrolyte in the can. An inner cover 34 provides compressive support for seal 32 to achieve the desired level of resistance to leakage of materials from cell 10. Seal 32 also electrically insulates negative terminal cover 30 from the side wall 12 of the can. The cathode 22 and the anode 26 are coaxially disposed with respect to each other, sharing the longitudinal axis 36 of the cell 10 as a common axis. A cell according to the invention includes CuO as an active material in the cathode. The following description of the cell of the invention makes reference to an embodiment with the type of cell design shown in FIG. 1. It is understood that, unless otherwise disclosed below, designs, components and materials suitable for use in such alkaline $Zn/MnO_2$ cells will also be suitable for use in cells according to the invention.

However, it is anticipated that other suitable cell designs, components and materials may also be adapted for use with the invention.

The can may be made of any material that is stable when in contact with the contents of the cell and the external environment. It may be convenient for the can to be made of a conductive material such as a metal so it may serve as a current collector for the outer electrode. Alkaline cell cans are often made from cold rolled steel. They are frequently plated with nickel on the external surface to protect against corrosion. The internal surface may include nickel and cobalt, and the surface in contact with the cathode may have a coating that includes graphite to provide good contact with the cathode.

In this embodiment the cathode may be formed in a generally hollow cylindrical shape. This may be done using an impact molding process, or the cathode may be preformed into one or more cylindrical rings, which are inserted into the can, pushed together to form a single cathode, and forced outward to make good contact with the inner surface of the can.

The cathode contains CuO as an active material. CuO is commercially available. In general, a low level of impurities is desired, and desirable maximum amounts of impurities will be similar to those that are desirable for $MnO_2$ used in alkaline $Zn/MnO_2$ cells. For example, 99.995% (metals base) and other grades of copper (II) oxide may be purchased from Alpha Aesar (Ward Hill, Mass., USA). For best results it is desirable to use material with a high oxidation level, such as $Cu_xO$ with x no greater than 1.3, preferably with x no greater than 1.05. If the material has a high $Cu_2O$ level, the material can be treated to oxidize $Cu_2O$ to CuO. This can be done by heating under a controlled atmosphere. This may be also accomplished by washing the material in a strong aqueous alkaline solution (e.g., 9 M KOH) in the presence of air. Alternatively, if the cell in which the material is to be used is an aqueous alkaline cell, the material may be blended with other cathode materials and a small amount of alkaline electrolyte solution in the presence of air. CuO can also be prepared chemically from copper (I) nitrate or copper (II) hydroxide, as described in detail below. The desired CuO particle size distribution and specific surface area can be achieved in a number of ways. First, material obtained from different sources may have different physical properties. Second, regardless of the source of the material, it can be classified according to particle size; e.g., by successive screening using standard sieves or by air classification. This will also tend to result in different specific surface areas in the various fractions, but the correlation between particle size and surface area is not always a strong one. Third, the material can be milled. Fourth, the material can be made under various conditions to affect the particle size distribution and specific surface area. Combinations of these methods may also be used.

As an alternative to CuO, $Cu_2O$ may be used as a starting material if it is treated and sufficiently oxidized, such as by one or more of the methods described above.

As disclosed above, the CuO can have a specific surface area of 1.0 to 4.0 $m^2$/gram. If the surface area is less than 1.0 $m^2$/gram, little improvement will result. Performance will be better if the specific surface area is at least 1.5 $m^2$/gram and even better if the specific surface area is at least 1.7 $m^2$/gram. Above 2.0 $m^2$/gram, the additional improvement in discharge performance with increasing specific surface area drops off, with little additional improvement above 3.0 $m^2$/gram. When the specific surface area is greater than 4.0 $m^2$/gram, increased reactivity and solubility may limit shelf life due to wasteful corrosion of the CuO and migration of copper ions to the anode, where they can react with the zinc.

The specific surface area of particulate materials such as CuO has a general correlation with particle size distribution. Other particle characteristics can have an effect on specific surface area. The median particle size ($D_{50}$) of CuO having a specific surface area within the desired range will generally be less than 100 μm and often less than 50 μm, but there is little correlation between the $D_{50}$ value alone and either specific surface area or discharge performance. However, a correlation has been observed between the fine particles and both specific surface area and discharge performance. CuO with $D_{10}$ values no greater than 3.0 μm have performed well. Performance has been better when $D_{10}$ is in the range of 1.0 to 2.0 μm, with the best performance observed in material with a $D_{10}$ value no greater than 1.7 μm.

CuO with a specific surface area within the desired range will comprise primary particles and agglomerated primary particles, with the primary particles typically in the range of 0.3 to 5.0 μm in size. The CuO performs well when the average primary particle size is 1.0 μm or less.

In addition to CuO the cathode may also contain one or more other active materials. These additional materials may be selected from those which are suitable as sole cathode active materials in alkaline cells in combination with the anode active material that is selected.

Examples of co-cathode materials for use in alkaline cells include electrolytic manganese dioxide (EMD), chemical manganese dioxide (CMD), natural manganese dioxide (NMD), other manganese oxides, silver oxides, mercury oxides, nickel oxyhydroxides (including beta and gamma forms), ferrates and bismuth oxides (e.g., $Bi_2O_3$). EMD can be obtained commercially from Kerr-McGee Chemical Corp. (Oklahoma City, Okla., USA), Erachem Comilog, Inc. (Baltimore, Md., USA) and Delta E.M.D. (Pty) Ltd. (Nelspruit, South Africa). CMD can be obtained commercially from Erachem Europe S.A. (Brussels, Belgium). Silver oxide, nickel oxyhydroxide and others can be purchased commercially.

Examples of co-cathode materials that can be used with CuO in nonaqueous cells include iron sulfides (e.g., $FeS_2$ and FeS), bismuth oxides (e.g., $Bi_2O_3$), and $TiS_2$.

The cathode may also include one or more electrically conductive materials, since many active materials are relatively poor conductors. Examples include graphite (expanded and non-expanded), fine graphitized carbon and metal particles such as copper and nickel. Graphite is often used in alkaline $Zn/MnO_2$ cells. The graphite can be natural, synthetic or a combination. The graphite can also be expanded, non-expanded or a combination. Non-expanded graphite powders are commercially available from Timcal America (Westlake, Ohio, USA), and expanded graphites are available from Superior Graphite Co. (Chicago, Ill., USA). The conductive materials should be stable and insoluble in the cell electrolyte. Because CuO is more resistive that EMD, more graphite may be needed in a cell with CuO rather than EMD as the active material. However, the copper metal produced during discharge of the CuO is highly conductive, while the EMD discharge product has a lower conductivity than the EMD.

A binder may be used to strengthen the cathode. Examples of binders that can be used in alkaline cells include fluorocarbon resins such as polytetrafluoroethylene (PTFE), available under the trade name TEFLON, and tetrafluoroethylene resin, available in a 60 weight percent solids dispersion under the product designation TFE 30B, from E.I. duPont de Nemours & Co., Polymer Products Div. (Wilmington, Del.). Other binder materials include polyethylene, available under the product designation COATHYLENE HA 1681 from Hoechst Celanese; and a diblock copolymer of styrene, ethylene and propylene, available under the product designation G1702 from Kraton Polymers Business. Polyacrylamides and Portland cement can also be used. Some CuO cathode mixtures may form stronger cathodes than similar EMD mixtures, therefore requiring less binder.

Any of a variety of additives may be included in the cathode to improve processing of the cathode mixture (e.g., surfactants) or to improve cell performance (e.g., a niobium-doped titanium dioxide, as disclosed in U.S. Pat. No. 6,524,250, issued Feb. 25, 2003, the entire disclosure of which is incorporated herein by reference). Other examples of performance enhancing additives are disclosed in the following U.S. Patents, which are hereby incorporated by reference: U.S. Pat. No. 5,342,712 (issued Aug. 30, 1994), U.S. Pat. No. 5,501,924 (issued Mar. 26, 1996), U.S. Pat. No. 5,569,564 (issued Oct. 29, 1996), U.S. Pat. No. 5,599,644 (issued Feb. 4, 1997) and U.S. Pat. No. 5,895,734 (issued Apr. 20, 1999). Calcium stearate is sometimes used as a mold release agent in cathode mixtures.

The specific formulation of the cathode will depend in part on the active material(s) selected and, if more than one, the ratios of the different active materials. The formulation will also depend in part on the desired electrical characteristics of the cell. Various embodiments are disclosed in greater detail below.

The separator comprises at least one layer of material that is ionically conductive and electrically insulating. It may be advantageous if the separator is capable of soaking up and holding electrolyte solution after the cell is assembled. Because CuO, and especially the intermediate discharge product $Cu_2O$, is somewhat soluble in common alkaline electrolyte solutions, the separator used in cells containing CuO may comprise a material that will not allow copper ions to readily pass from the cathode to the anode. To assure good discharge capacity, provide good shelf life and prevent excessive hydrogen gas generation at the anode, a separator essentially impermeable to copper ions may be used. Cellophane type materials are suitable because they may scavenge copper ions from solution and block them from reaching the anode. It may be desirable to use a layer of cellophane in combination with another material, such as a material that is suitable as an alkaline $Zn/MnO_2$ separator material, e.g., to facilitate separator handling. An example of a material that may be used for the copper ion impermeable separator is battery grade N-methylamine-N-oxide-based cellophane film, product designation 215E150, available from UCB Films, Smyrna, Ga., USA.

Commonly used alkaline $Zn/MnO_2$ cell separator materials include polymeric films and woven and non-woven papers and fabrics. Examples of non-woven materials include porous, wet-laid materials of non-woven synthetic fibers, such as VLZ 105 grade separator from Nippon Kodoshi Corp. of Kochi-ken, Japan and grade FS2100/063 and FS22824 separators from Freudenberg Vliesstoffe KG of Neuenburg, Germany. Another example of a material that can be used as a non-woven layer in combination with a cellophane layer is one containing 78-82 weight percent PVA and 18-22 weight percent rayon with a trace of surfactant, available under the trade name PA 25 from PDM. An example of a polymeric material which may be used alone or as a coating on a woven or non-woven paper or fabric is poly (acrylic acid-co-sodium-4-styrene sulfonate), as disclosed in International Patent Publication No. 02/101,852, published 19 Dec. 2002, and International Patent Publication No. 02/18,144, published 7 Jun. 2002, which are hereby incorporated by reference. The copper ion impervious layer may be placed adjacent to either the cathode or the anode.

The anode of an alkaline cell can comprise a mixture of gelled zinc particles. The zinc may be in powder or flake form, or a combination of the two. An unamalgamated zinc alloy comprising bismuth, indium, and aluminum may be used. Zinc powder, preferably having a $d_{50}$ of about 110 µm, may be obtained from Umicore (Brussels, Belgium), and zinc flake (e.g., grade 5454.3) may be obtained from Transmet Corp. (Columbus, Ohio, USA).

The anode can also comprise water, potassium hydroxide electrolyte, and a gelling agent. Acrylic acid in the 100% acid form, such as CARBOPOL® 940 from Noveon, Inc. (Cleveland, Ohio, USA) is a common gelling agent. Small amounts of other materials may also be added to the anode mixture and/or electrolyte to minimize gas generation in the cell and/or enhance discharge performance. Examples of such materials include $In(OH)_3$, $ZnO$, and sodium silicate.

The total potassium hydroxide concentration in the electrolyte in the completed, undischarged cell can be from about 25 to about 50 weight percent, generally from about 36 to about 40 weight percent.

Sodium hydroxide may be used along with or instead of potassium hydroxide. Sodium hydroxide may be advantageous from a cost standpoint, though better discharge performance is often seen with potassium hydroxide. If NaOH is used rather than KOH, an overall concentration in the electrolyte in the cell may be about 19 weight percent.

The specific composition of the anode will depend in part on the active material selected and the operating requirements of the cell.

The relative amounts of anode and cathode in the cell are generally closely balanced to maximize discharge efficiency.

The anode current collector in an alkaline cell with zinc as an active material is generally made from highly conductive metals such as copper, brass and their alloys. They are often alloyed and/or coated with a metal having a higher hydrogen overvoltage than copper in order to reduce hydrogen gas generation, especially when the zinc is unamalgamated. Examples of such metals include zinc, indium and tin.

Any suitable means can be used to close the open end of the can and seal the active materials and electrolyte in the cell. This often includes one or more metal covers and a polymeric seal or grommet. A pressure relief vent is generally included in at least one of the covers, the seal or the can to provide a controlled release of internal pressure from the cell if it should exceed an established limit.

The cell may include a jacket around the exterior surface of the can side wall, particularly if the battery contains only a single cell. A plurality of electrically connected cells may be put together into a single case to form a multiple cell battery with the desired electrical characteristics and other features.

As disclosed above, the formulation of the cathode mixture will depend in part on the types of materials selected and the desired electrical characteristics of the cell. In one embodiment the cell contains only CuO as an active material. Such a cathode mixture may contain the following amounts of dry ingredients:

CuO—10-98 weight percent;

graphite or other electrical conductor—0-30 weight percent;

binder—0-20 weight percent; and additives—0-25 weight percent each.

In cylindrical alkaline CuO cells, the cathode will generally contain 80 to 98 weight percent CuO. In cells with thin printed electrodes, the cathode may contain anywhere from 10 to 98 weight percent CuO.

In other embodiments the cell contains both CuO and EMD as active materials. Cells with different ratios of EMD to CuO can be advantageous in different ways or under different circumstances.

Table 1 shows cathode, anode and electrolyte formulations of an embodiment of the invention with CuO as the sole active cathode material and having two layers of separator (Freudenburg FS22824 and UCB 215R150). The cell is an R6 size cell with an electrode configuration like that shown in FIG. 1. The cathode is formed from a stack of 4 molded rings and has a final outside diameter of 0.527 inch (13.39 mm), an inside diameter of 0.413 inch (10.49 mm) and a height of 1.667 inch (42.34 mm). The anode cavity within the cathode and separator is about 0.398 inch (10.11 mm) in diameter. An additional 1.0 gram of 45 weight percent KOH solution is added to the cell after forming the cathode and inserting the separator, before the anode is dispensed into the cell.

The above description is particularly relevant to cylindrical aqueous alkaline cells having zinc as the negative electrode active material and having a bobbin type electrode configuration. However, the invention may also be adapted to other types of cells, both primary and rechargeable, including cells having other electrochemical systems, such as aluminum and magnesium alkaline cells, rechargeable nickel alkaline cells and primary and rechargeable nonaqueous cells with lithium, aluminum and magnesium based negative electrodes. Cell designs and materials used will be those that are suitable for use with the cell electrochemistry and the types of devices and environments in which the cell is intended to be used.

TABLE 1

| | |
|---|---|
| Cathode mixture | 9.81 grams |
| CuO | 86.2 weight percent |
| Expanded graphite | 7.9 weight percent |
| 45 weight percent KOH solution | 5.9 weight percent |
| Anode mixture | 9.72 grams |
| Zinc (powder plus flake) | 69.8 weight percent |
| Electrolyte solution | 28.7 weight percent |
| Water | 1.2 weight percent |
| Gellant | 0.4 weight percent |
| Electrolyte Solution | (in anode) |
| 45 weight percent KOH solution | 96.7 weight percent |
| ZnO | 3.0 weight percent |
| Sodium silicate | 0.3 weight percent |

Battery cells according to the invention can have many advantages over those CuO-containing cells that were previously known, including one or more of the following:
  increased cell operating voltage on discharge;
  increased cell discharge capacity to high voltage endpoints;
  adequate voltage maintained to satisfactorily operate more devices that are designed to use "1.5-volt" alkaline Zn/MnO$_2$ batteries;
  adequate voltage maintained to operate some devices that would not be operated without the CuO of the invention;
  better discharge capacity on constant power discharge due to a higher voltage in the early part of discharge;
  better high rate and high power discharge capacity than conventional CuO.

Battery cells according to the invention can also have one or more of the following advantages over cells with just MnO$_2$ as the active cathode material:
  increasing cathode conductivity during discharge;
  flatter discharge voltage profile than for MnO$_2$;
  improved discharge performance to a wider range of voltage endpoints by replacing a portion of the EMD in a "1.5-volt" alkaline Zn/MnO$_2$ cell with CuO;
  improved molding characteristics compared to EMD;
  smaller cathode volume required than for EMD, leaving more volume available for anode;
  two-step discharge voltage profile, useful as an indicator of state of cell discharge; and
  greater capacity on constant resistance discharge than EMD.

Some of the above advantages will be apparent in the following examples and referenced drawings. For instance, when CuO with the desired specific surface area is discharged in a flooded half cell with 45 weight percent KOH electrolyte at a constant current rate of 10 mA/gram of CuO (roughly equivalent to 100 mA for a typical LR6 alkaline Zn/MnO$_2$ cell), the capacity delivered at a potential of 0.90 or more vs. Zn/ZnO is substantially increased. The CuO is capable of providing more than 200, and even more than 250, mAh/gram of CuO at 0.90 volt or above. Looking at the improvement from a different perspective, at least 30 percent, or even more than 40 percent, of the total capacity of the CuO is delivered at 0.90 volt or more.

EXAMPLE 1

PURATRONIC® copper (II) oxide powder (product no. 10700) was obtained from Alpha Aesar (Ward Hill, Mass., USA). This material is nominally 99.995% CuO (metals basis), and has a density of 6.3-6.49 g/cm$^3$. Samples of the CuO material were tested to determine the particle size distribution and specific surface area. The particle size analysis was made using a MICROTRAC® X-100 Particle Size Analyzer. The specific surface area determination was done by the BET method, using nitrogen. The results are summarized in Table 2.

A sample of the CuO material was examined using a scanning electron microscope. The material was comprised of large agglomerates of much smaller primary particles.

A sample of the CuO material was evaluated electrochemically in a flooded half cell. An electrode mixture was prepared by combining 45 weight percent of the CuO sample, 45 weight percent KS6 non-expanded graphite powder (Timcal America, Westlake, Ohio, USA) and 10 weight percent of 9.0 M KOH solution. The CuO and graphite were combined, then worked with a mortar and pestle until homogeneous. The KOH solution was added and the mixture worked again with a mortar and pestle.

Figure 2:
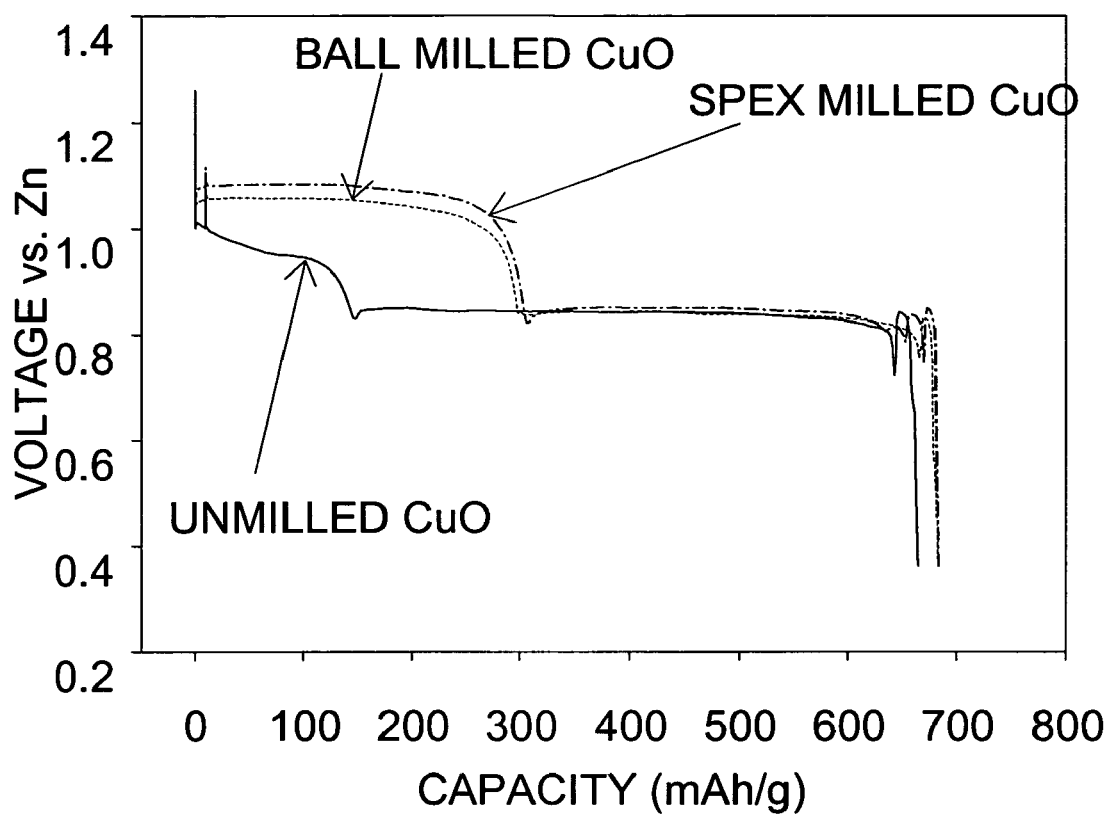
FIG. 2 is a plot comparing flooded half-cell discharge curves for electrodes made with commercially available CuO and CuO according to the invention.

The cell body used had a cylindrical LUCITE® body. A nickel plated stainless steel current collector with a contact tab was seated into a well in the bottom of the cell body, with the contact tab passing through a hole in the center of the base. A disk of plastic film with low water permeability (PARAFILM M® from Pechiney Plastic Packaging, Inc.) was used to seal the interface of the current collector with the cell body and prevent electrolyte from leaking through the tab hole. About 0.1654 g of CuO electrode mixture was formed into a pellet, using a Carver press and an applied pressure of 5,000 pounds per square inch (352 kg/cm$^2$), and the pellet was placed onto the current collector in the bottom of the cell body. Three pieces of cellulose separator (Product No. 9258 from The Dexter Corporation, Windsor Locks, Conn.) were placed on top of the pellet, followed by a perforated nylon disk. A threaded LUCITE® piston was placed into the cell and tightened to a torque of 30 cm-kg. The cell was then filled with about 7 ml of 45 weight percent KOH solution and sealed with PARAFILM M®. A platinum wire counter electrode and a Hg/HgO reference electrode were inserted into the cell. After allowing the cell to equilibrate for about 30 minutes, the cell was discharged continuously at a rate of 10 mA/g of CuO active material. Voltages were mathematically converted to voltages vs. a Zn/ZnO reference electrode by adding 1.36 volts. The results are shown in FIG. 2, which is a graph showing the capacity in mAh/g of CuO on the x-axis and the voltage vs. Zn/ZnO on the y-axis.

EXAMPLE 2

About 10 grams of the same CuO material used in Example 1 was placed in a 4 oz. polyethylene bottle with 10 pieces of 0.5 inch (12.7 mm) ceramic media and milled for about 12 hours. Samples of the ball-milled CuO were evaluated for particle size distribution, specific surface area and discharge performance in a flooded half cell, using the same methods as described in Example 1. The particle size and specific surface area results are summarized in Table 2. The discharge results are compared with those from Example 1 in FIG. 2. The ball milled material contained primary particles of about 1 μm in size as well as some relatively small agglomerates.

TABLE 2

| Material | Ave. Particle Size - $D_{50}$ (μm) | Specific Surface Area ($m^2/g$) |
|---|---|---|
| CuO as received (Example 1) | 188 | 0.22 |
| Ball-milled CuO (Example 2) | 3 | 1.59 |

EXAMPLE 3

About 8.5 grams of the same CuO material used in Example 1 was placed in a zirconia vial set with 2 pieces of 0.5 inch (12.7 mm) zirconia media and milled for about 2 hours using a high energy Model 8000 Spex Mill (SPEX CertiPrep, Inc., Metuchen, N.J., USA). Samples of this Spex-milled CuO were examined using a scanning electron microscope and tested in a flooded half cell, using the same method as described in Example 1. The primary particles were reduced in size to less than 1 μm. The discharge results are compared with those from Examples 1 and 2 in FIG. 2. As for ball-milling, the reduced particle size and increased specific area from Spex-milling resulted in a substantial increase in capacity at the higher voltage when compared to unmilled material.

EXAMPLE 4

Subsequent work was done to evaluate the effects of Spex-milling for different times. Another sample of the CuO material used in Example 1 was obtained. The particle size distribution of a portion of this sample was determined as described in Example 1, except that, because of the large amount of very large particles, the material was first screened to remove particles larger than 500 μm; 26 weight percent was removed. Portions of the sample were Spex-milled for different times, and the particle size distributions were analyzed; it was not necessary to sieve the Spex-milled materials. The $D_{50}$, $D_{90}$ and $D_{10}$ values are summarized in Table 3.

The unmilled material had a single peak centered at about 230 μm. The milled materials had bimodal distributions. Milling for up to 30 minutes reduced the $D_{50}$ value, but the $D_{50}$ value increased with additional milling. The peaks of the material milled for 10 minutes were centered at about 3 μm (0.8-10 μm) and about 20 μm (3-100 μm). Milling for 30 minutes increased the proportion of fines but increased the average (to 25 μm) and breadth (to 4-300 μm) of the second peak. In general, the proportion of fine particles decreased with additional milling, indicating reagglomeration of some of the particles, but the $D_{10}$ values continued to get smaller, indicating a reduction in the size of the primary particles.

Examination of the materials with a scanning electron microscope showed that, except for some of the largest agglomerates, the primary particles and the agglomerates are reasonably spherical (aspect ratios of about 1.2). The largest agglomerates generally had aspect rations of about 2 before milling and after 10 minutes of milling; the largest agglomerates in the other samples had aspect ratios of about 1.2. Milling reduced the size of the primary particles from about 1-3 μm before milling to about 0.3-2.5 μm.

The specific surface area of the unmilled and milled CuO was also determined as described in Example 1, and the results are included in Table 3. The specific surface area and $D_{10}$ values continued to increase with increasing milling time, even though the $D_{50}$ values did not.

TABLE 3

| Milling Time | $D_{50}$ (μm) | $D_{90}$ (μm) | $D_{10}$ (μm) | Surf. Area ($m^2/g$) |
|---|---|---|---|---|
| 0 | 213.0 | 457.1 | 50.3 | 0.22 |
| 10 min. | 9.6 | 47.8 | 2.3 | 0.9 |
| 30 min. | 4.4 | 49.7 | 1.9 | 1.45 |
| 1 hour | 9.6 | 68.1 | 1.7 | 1.8 |
| 2 hours | 20.45 | 83.7 | 1.8 | 2.2 |
| 4 hours | 21.6 | 89.9 | 1.8 | 2.7 |
| 12 hours | 18.2 | 72.1 | 1.3 | 2.9 |

Figure 3:
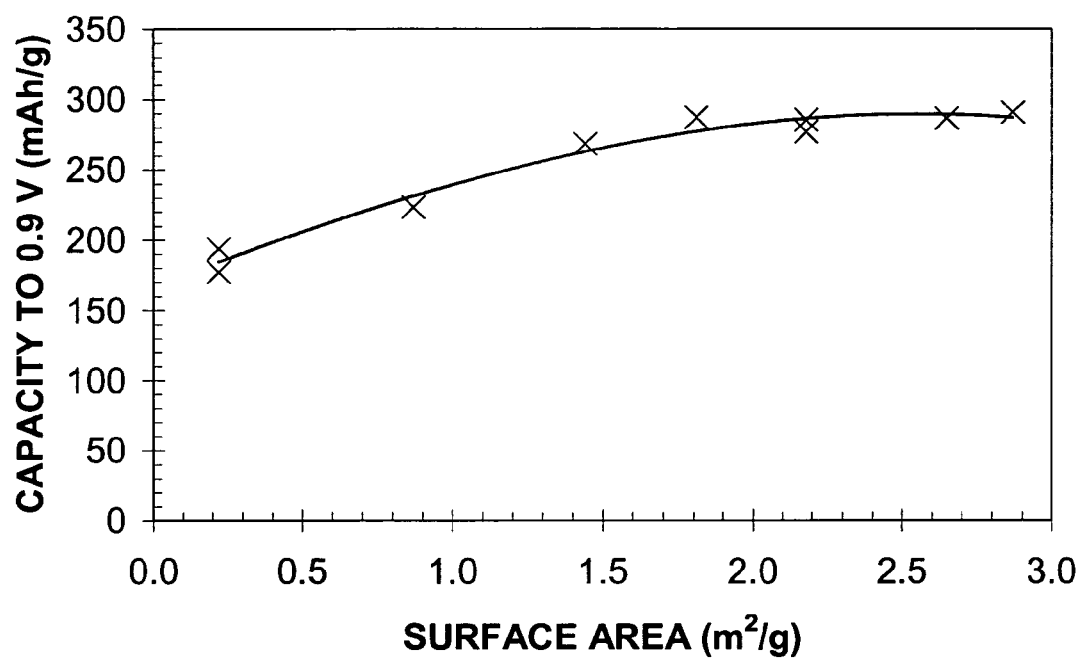
FIG. 3 is a plot showing CuO discharge capacity as a function of specific surface area.

The discharge capacity of CuO from each of the samples in Table 3 was also determined. Electrodes were made and tested in flooded half cells as described in Example 1, except for the following: electrode pellet weight (0.2786 g), weight ratio of CuO to graphite in electrode mixture (8.2:1), electrode current collector (gold-plated with a nickel tab), electrode mixture (no electrolyte), pellet molding pressure (12,000 pounds per square inch (844 kg/cm²) for one minute), separator (4 layers of 700/73 separator from Scimat), counter electrode (gold-plated nickel mesh), electrolyte (37 weight percent KOH saturated with ZnO and filtered), and reference electrode (zinc wire in 37 weight percent KOH and 3 weight percent ZnO electrolyte, gelled with Carbopol®940). The discharge capacities to 0.90 volt are plotted as a function of the specific surface area of the CuO sample in FIG. 3. Discharge capacity increases as specific surface area increases. The curve begins to level off above a specific surface area of about 1.5 m²/gram so that little additional capacity would be expected for as the specific surface area increases above 3.0 m²/gram.

EXAMPLE 5

Copper (I) oxide (99% $Cu_2O$, metals basis) was obtained from Alfa Aesar. Samples of the material were prepared and evaluated as received, after ball-milling and after Spex-milling, as in Examples 1-3, except that 10.5 grams of the $Cu_2O$ was Spex-milled compared to 8.5 grams of CuO in Example 3. The particle size distribution and specific surface area of portions of the unmilled and ball milled $Cu_2O$ samples were determined as described for the CuO materials in Examples 1-3, and the results are summarized in Table 4. Portions of the unmilled, ball milled and Spex-milled $Cu_2O$ samples were made into electrodes and tested in flooded half cells as described in Examples 1-3, and the results are plotted in FIG. 4.

TABLE 4

| Material | Ave. Particle Size - $D_{50}$ (μm) | Specific Surface Area ($m^2/g$) |
| --- | --- | --- |
| $Cu_2O$ as received | 16 | 0.30 |
| Ball-milled $Cu_2O$ | 3.6 | 1.33 |

As in Examples 1-3, reducing the particle size and increasing the specific surface area of the $Cu_2O$ material resulted in a significant increase in the discharge capacity delivered at the higher voltage.

EXAMPLE 6

Figure 4:
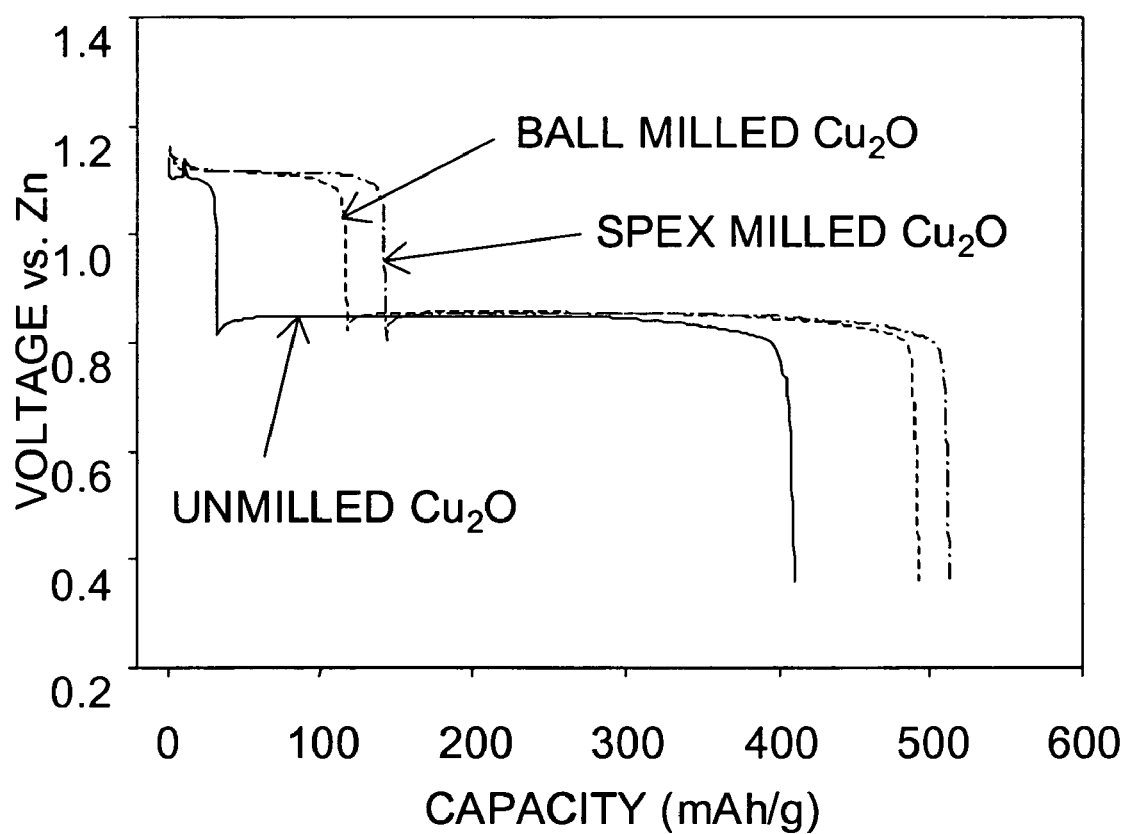
FIG. 4 is a plot comparing flooded half-cell discharge curves for electrodes made with milled and unmilled $Cu_2O$.

Two voltage plateaus were observed in each of the discharge curves in FIG. 4. It was believed that the presence of these two plateaus was the result of oxidation of a portion of the $Cu_2O$ to CuO during the preparation of the electrode mixtures, in which $Cu_2O$ was mixed with KOH electrolyte solution in air. To confirm this and to evaluate the effects of both milling the $Cu_2O$ and partially oxidizing the $Cu_2O$ during mixing, additional electrodes were made and tested as follows.

A first lot of electrodes was prepared using unmilled $Cu_2O$ from the same source as the material used in Example 5. The electrode preparation was done as described in Example 1, except that the electrode mixture contained 50 weight percent each of $Cu_2O$ and graphite (no KOH solution), and electrode pellets were formed by molding the mixture at 5,000 pounds per square inch (352 $kg/cm^2$) for 1 minute.

A second lot of electrodes and flooded half cells was prepared in the same manner as the first lot, using $Cu_2O$ that had been Spex-milled.

A third lot of electrodes and flooded half cells was also prepared in the same manner as the second lot, using Spex-milled $Cu_2O$, except that the electrode mixture contained $Cu_2O$, 45 graphite and 37% KOH solution in a ratio of 45:45:10 by weight, and the electrode ingredients were mixed in the presence of air.

Figure 5:
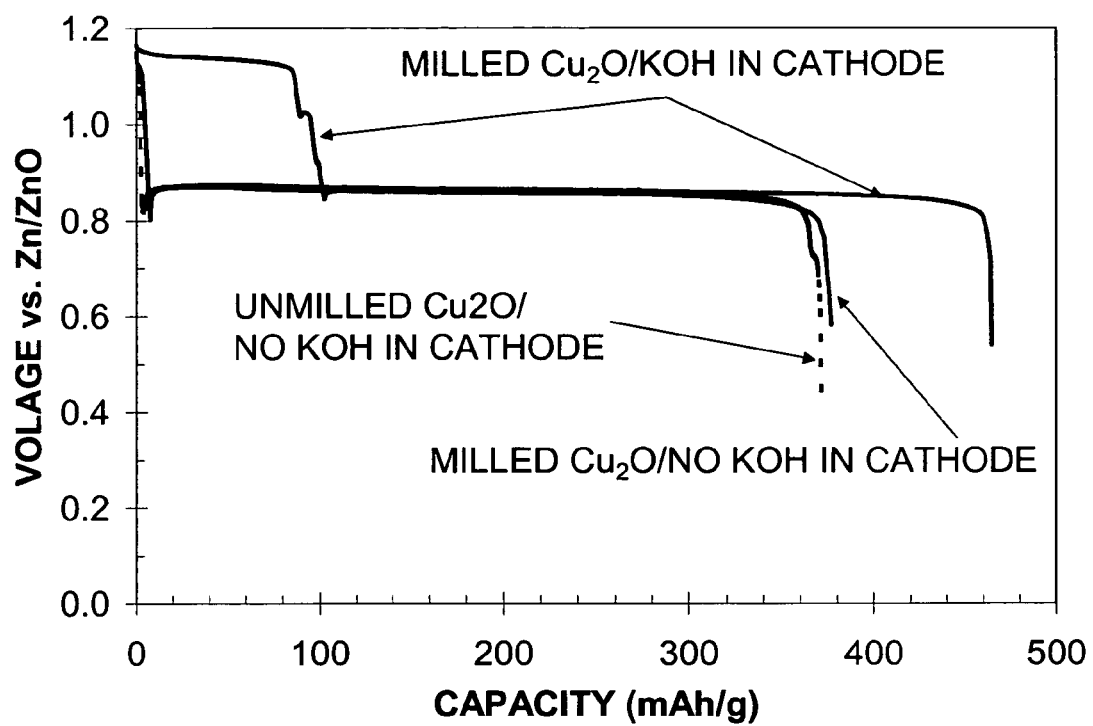
FIG. 5 is a plot comparing flooded half-cell discharge curves for electrodes made with commercially available $Cu_2O$ and $Cu_2O$ according to the invention, with and without KOH blended with the electrode mixture.

Electrodes from each of the three lots were put into flooded half cells as described in Example 4, except that the electrolyte solution did not contain ZnO, and discharged at a constant rate of 10 mA/g of $Cu_2O$. The discharge test results are shown in FIG. 5. Just increasing the specific surface area of the $Cu_2O$ resulted in little improvement in discharge capacity, but the increased surface area enhanced the effects of blending the dry $Cu_2O$ electrode ingredients with KOH solution in the presence of air.

EXAMPLE 7

Figure 6:
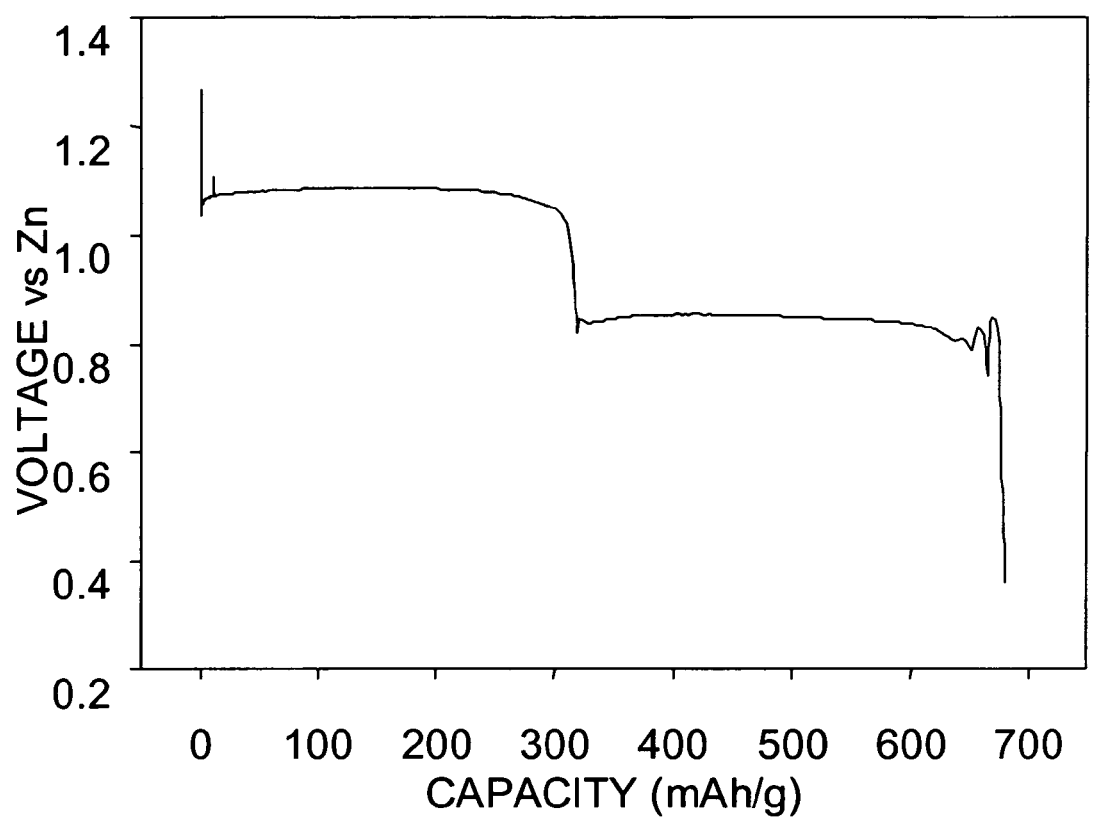
FIG. 6 is a plot showing a flooded half-cell discharge curve for an electrode made with chemically synthesized CuO according to the invention.

CuO was made from copper (II) nitrate and sodium hydroxide. 41.9 ml of 3M $Cu(NO_3)_2$ solution was made by dissolving 30.37 g of $Cu(NO_3)_2 \cdot 3H_2O$ in 41.9 ml of water. 50 ml of 3M NaOH was added, forming $Cu(OH)_2$ as a precipitate. The $Cu(OH)_2$ was washed, filtered, dried and heated for 24 hours at 200° C. to produce CuO. The particle size distribution and specific surface area were determined as described in Example 1. The particles had a bimodal distribution with peaks centered at about 3 μm and 35 μm and a $D_{50}$ value of about 13.7 μm. The specific surface area was about 3.28 $m^2$/gram. Electrodes were made and discharged as described in Example 1. The discharge curve (mAh/g of CuO on the x-axis and voltage vs. Zn/ZnO on the y-axis) is shown in FIG. 6.

EXAMPLE 8

Cathodes with CuO as the active material were compared to cathodes with EMD as the active material in full cells. The CuO was Spex-milled for 2 hours and had an average specific surface area of 2.18 $m^2/g$. The CuO cells were similar to those in Example 4, except that the average cathode weight was 0.2601 gram (0.2319 gram CuO), the average cathode volume was 0.0501 $cm^3$, and the counter electrode was zinc expanded metal instead of a platinum wire. The EMD cells were made in a similar manner to the CuO cells except that the weight ratio of EMD:graphite was increased to 11.5:1, since less graphite was needed to provide sufficient electrical conductivity in the cathode, the average cathode weight was 0.2076 gram (0.1911 gram EMD), and the cathode pellets were molded at 5,000 pounds per square inch (352 $kg/cm^2$) for one minute to achieve a final volume of 0.0503 $cm^3$.

Figure 7:
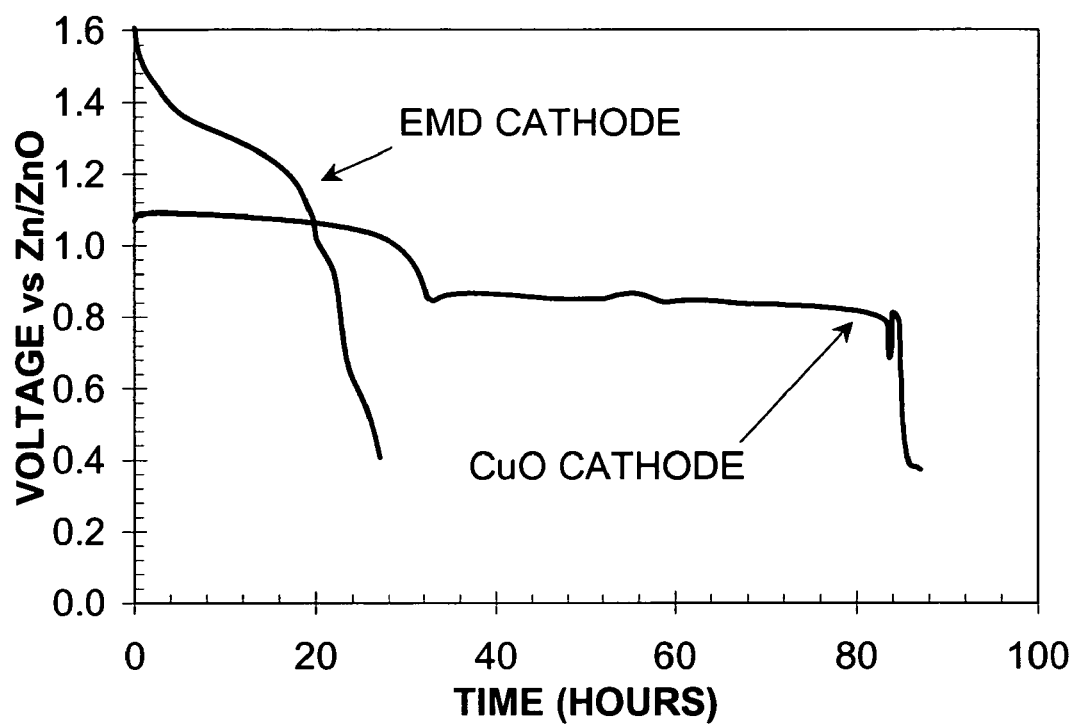
FIG. 7 is a plot showing discharge curves for electrodes made with electrolytic manganese dioxide and CuO according to the invention, discharged against zinc counter electrodes.

The cells were discharged on a constant resistance load of 498 ohms (an average discharge rate of about 10 mA/g of active material). The discharge curves are shown in FIG. 7. The average discharge times to several voltages are compared in Table 5 below. These results show the advantage of the CuO of the invention as a cathode material to voltages that are representative of the minimum voltage requirements some of the common types of devices in which alkaline $Zn/MnO_2$ cells are used.

TABLE 5

| | Average Discharge Time (hours) | | CuO/EMD Cell |
| --- | --- | --- | --- |
| Voltage | EMD Cathode Cells | CuO Cathode Cells | Discharge Time |
| 1.0 | 19.6 | 29.0 | 148% |
| 0.9 | 22.4 | 32.0 | 143% |
| 0.8 | 22.6 | 82.5 | 365% |
| 0.75 | 23.0 | 83.6 | 363% |

As disclosed above alkaline cells containing CuO as an active positive electrode material and a zinc-containing negative electrode can be used for "1.5 volt" cell applications. To more fully use the capacity of the CuO, especially in devices with high discharge rates and high minimum voltage requirements, CuO cells can be made using suitable active anode materials to provide a nominal cell voltage of about 1.0. Alternatively, three Zn/CuO cells may be used to replace two conventional 1.5 volt cells.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. An electrochemical battery cell comprising:
   a cell container;
   a positive electrode comprising a positive electrode active material;
   a negative electrode comprising a negative electrode active material comprising zinc;
   a separator disposed between the positive and negative electrodes; and
   an electrolyte;

wherein the positive electrode active material comprises copper oxide and one or more additional active materials, the one or more additional positive electrode active materials comprises manganese dioxide, the copper oxide has a formula $Cu_xO$, where x is from 0.9 to 1.3, and the copper oxide has a BET specific surface area from 1.0 to 2.9 m²/gram.

2. The cell defined in claim 1, wherein the $Cu_xO$ comprises particles that have a $D_{50}$ value less than 50 μm and a $D_{10}$ value from 1.0 to 3.0 μm, as measured by laser diffraction analysis using a unified scatter technique.

3. The cell defined in claim 1 wherein the electrolyte comprises an aqueous alkaline solution.

4. An electrochemical battery cell comprising:
a cell container;
a positive electrode comprising a positive electrode active material;
a negative electrode comprising a negative electrode active material comprising zinc;
a separator disposed between the positive and negative electrodes; and
an aqueous alkaline electrolyte; wherein
the positive electrode active material comprises copper oxide having a formula $Cu_xO$, where x is from 0.9 to 1.3, a BET specific surface area from 1.0 to 2.9 m₂/gram, and a particle size distribution with a $D_{50}$ value less than 50 μm as measured by laser diffraction analysis using a unified scatter technique, and the positive electrode active material further comprises manganese dioxide.

5. The cell defined in claim 4, wherein the BET specific surface area is from 1.45 to 2.9 m²/gram.

6. The cell defined in claim 5, wherein the BET specific surface area is from 1.7 to 2.9 m²/gram.

7. The cell defined in claim 4, wherein the particle size distribution further has a $D_{10}$ value from 1.0 to 2.0 μm.

8. The cell defined in claim 7, wherein the $D_{10}$ value is from 1.0 to 1.7 μm.

9. The cell defined in claim 4, wherein the $Cu_xO$ has an average primary particle size from 0.3 to 5.0 μm.

10. The cell defined in claim 9, wherein the average primary particle size is from 0.3 to 1.0 μm.

11. The cell defined in claim 1, wherein the positive electrode further comprises graphite, and the graphite consists essentially of a non-expanded graphite powder.

12. The cell defined in claim 4, wherein the positive electrode further comprises graphite, and the graphite consists essentially of a non-expanded graphite powder.

* * * * *